Patented July 1, 1924.

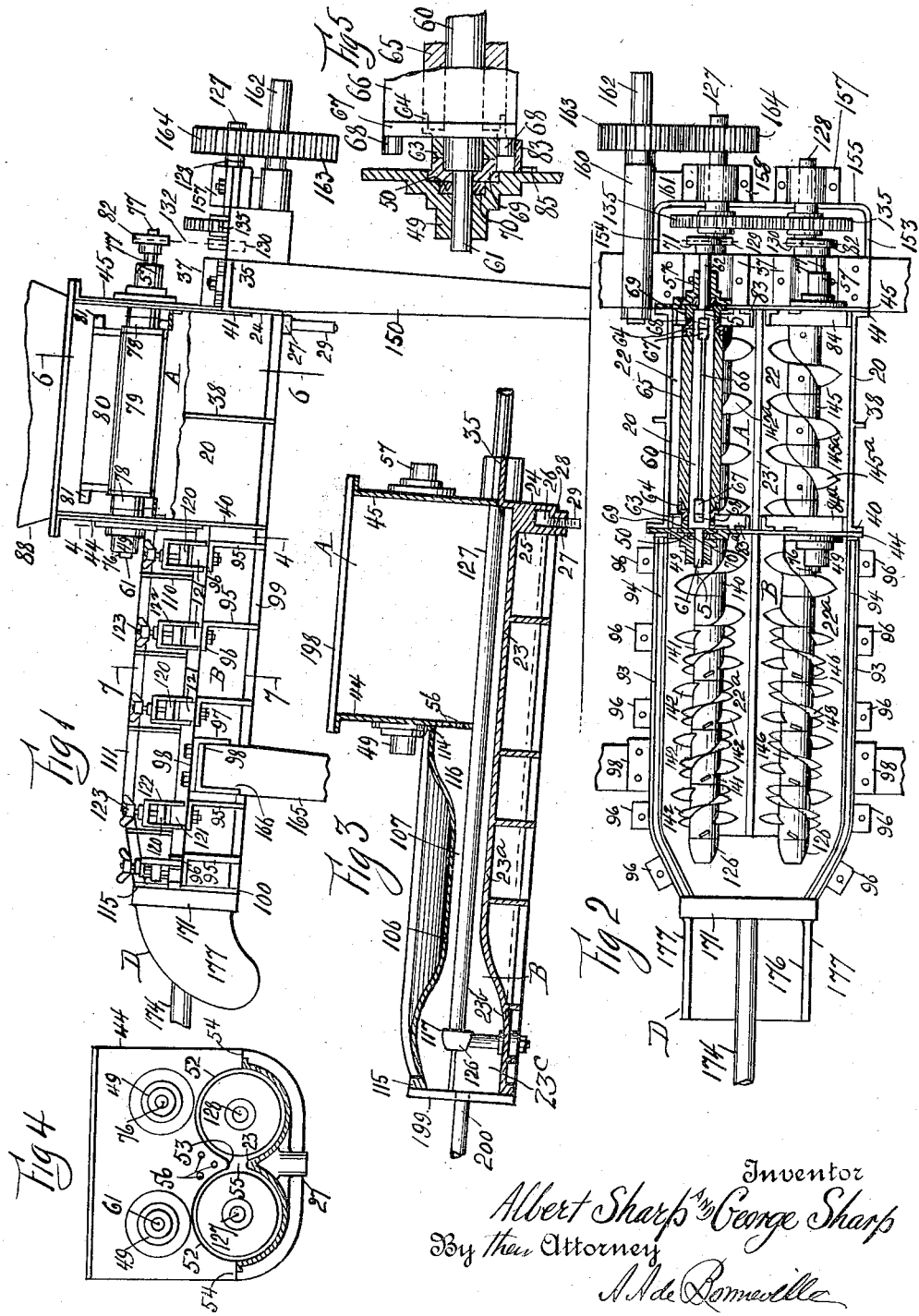

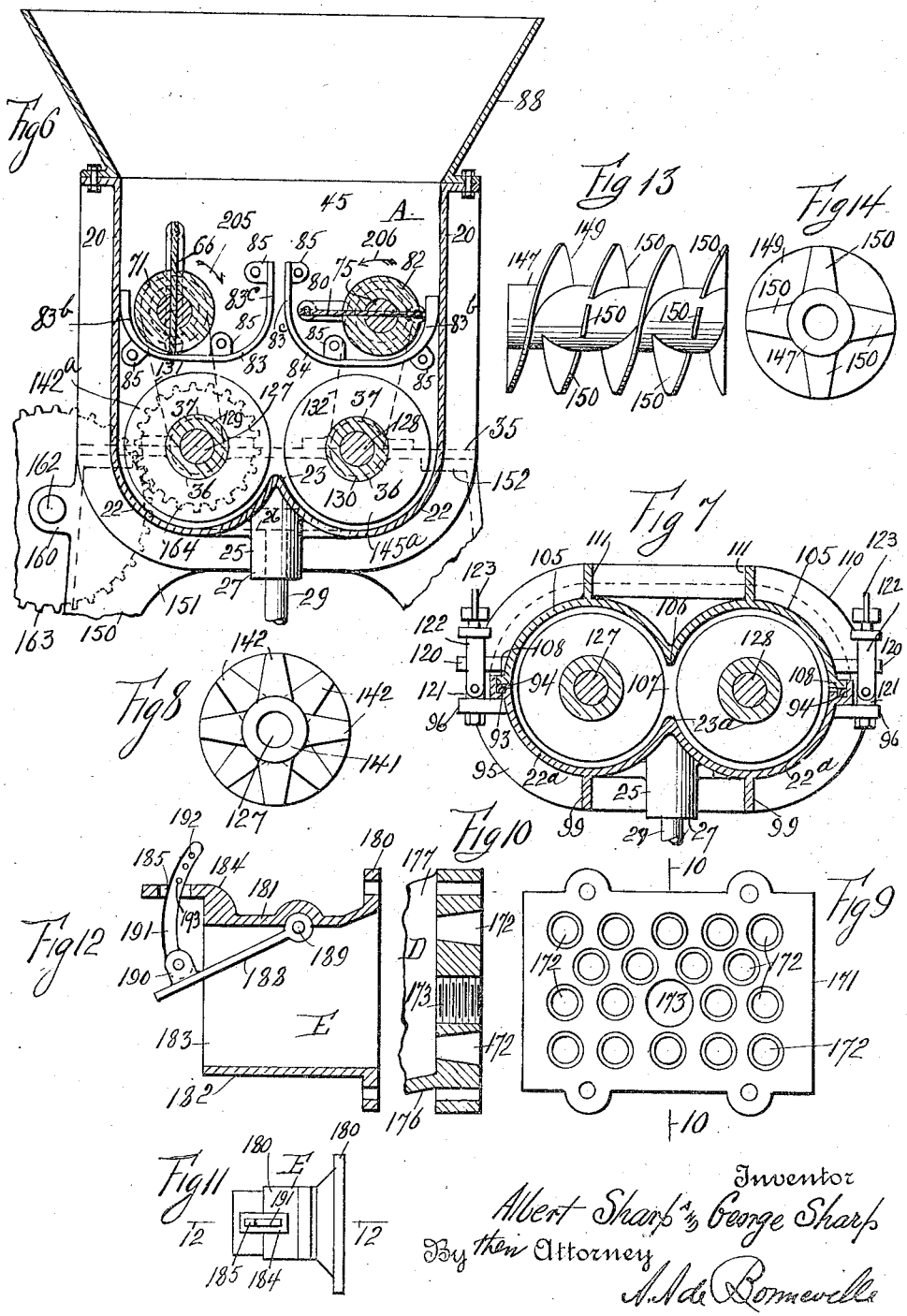

1,499,790

UNITED STATES PATENT OFFICE.

ALBERT SHARP AND GEORGE SHARP, OF BAYONNE, NEW JERSEY.

KNEADING MACHINE.

Application filed October 11, 1921. Serial No. 507,107.

*To all whom it may concern:*

Be it known that we, ALBERT SHARP and GEORGE SHARP, citizens of the United States, and residents of Bayonne, in the county of Hudson and State of New Jersey, have jointly invented certain new and useful Improvements in a Kneading Machine, of which the following is a specification.

This invention relates to a kneading machine for plastic substances and is particularly applicable for kneading oleomargarine, butter and the like, which after treatment in the machine does not require any separate blending treatment.

The object of the invention is the production of a machine whereby plastic substances, butter, oleomargarine and the like is efficiently kneaded, and of which the requisite amount of fluid or water originally contained therein is removed. Another object of the invention is to provide means whereby the treatment of the substances operated upon will be uniform from the inlet end to the outlet end of the machine. With this invention the substances operated upon are kneaded, blended and relieved of some of their fluid portions, at practically a uniform pressure.

This invention discharges its products with a uniform blend and texture. Another object of the invention is to provide means whereby it can be thoroughly cleaned and sterilized, and its parts are constructed to prevent the accumulation of any portion of the substance that is being operated upon and which may become foul if not removed during the operation of the machine.

The organization of the invention essentially comprises a feeding and kneading chamber, which at its lower portion connects with a conveying and kneading chamber. A pair of rotating and sliding pushers operate in the upper end of the feeding chamber and a pair of spiral or helical conveyers operate in both the conveying chamber and the lower portion of the feeding chamber. The conveyers may be single threaded helixes, double threaded helixes or a combination of both. Some of the windings of the helixes may be interrupted to form blades that coact in conjunction with the full windings of the conveyers. The blades of the interrupted helixes may be disposed to break joints with each other to insure the efficient and uniform kneading, blending and partial extraction of the fluids of the substances operated upon.

In the accompanying drawings Fig. 1 represents a side elevation, partly broken away, of an exemplification of the kneading machine; Fig. 2 shows a top plan view of Fig. 1 with a cover thereof omitted and a section on the line 2, 2 of Fig. 1; Fig. 3 indicates a section on the line 3, 3 of Fig. 2 with a modification; Fig. 4 shows a section of Fig. 1 on the line 4, 4; Fig. 5 indicates an enlarged section of Fig. 1 on the line 5, 5; Fig. 6 represents an enlarged section of Fig. 1 on the line 6, 6; Fig. 7 shows an enlarged section of Fig. 1 on the line 7, 7; Fig. 8 indicates an enlarged side view of a detail; Fig. 9 shows a rear elevation of a detail; Fig. 10 indicates a section of Fig. 9 on the line 10, 10; Fig. 11 represents a top plan view of a modification; Fig. 12 shows an enlarged section of Fig. 11 on the line 12, 12; Fig. 13 is an enlarged side view of a detail and Fig. 14 indicates a right hand end view of Fig. 13.

The machine in this instance comprises the feeding and kneading chamber A which at its lower portion is connected to the conveying and kneading chamber B.

The chamber A comprises the side walls 20 and the semi-cylindrical bottom walls 22 which latter at their junctions form the longitudinal apex 23. The rear wall 24 of the chamber A joins with the bottom walls 22 and the apex 23. The wall 24 is extended as indicated at 25. A cross port 26 is formed in the extended portion 25 which connects the subdivisions formed in the bottom of the chamber A by its bottom walls 22. A boss 27 is formed with the extended portion 25 and has formed therein a threaded outlet opening 28. Piping 29 extends from the opening 28. A table 35 extends from the rear wall 24 and has formed therewith the lower halves 36 of journal bearings. Caps 37 are provided for the halves 36. The walls 22 of the chamber A extend forwardly and form the bottom walls of the conveying and kneading chamber B indicated at 22$^a$. The walls 22 and 22$^a$ incline upwardly from the rear end of the machine to drain fluid, water and the like through the opening 28 and piping 29. Strengthening ribs 38 and flanges 40 and 41 are formed with the walls 20 and 22 of the chamber A.

A front wall 44 is detachably secured to the flange 40 and a rear wall 45 is detachably secured to the flange 41.

The front wall 44 has formed therewith the pair of journal bearings 49 which are recessed at 50. The lower contour of the wall 44 comprises two semi-circular openings 52, which at their juncture form the apex 53 and at their sides terminate in the heels 54. A port 55 is formed between the apexes 55 and 23. Openings 56 may be made in the lower portion of the wall 44.

The rear wall 45 of the chamber A bears upon the table 35, and has formed therewith, the pair of journal bearings 57 which are similar to the journal bearings 49.

A shaft 60 is shown with the end portions 61 and 62 of smaller diameter. The said portions 61 and 62 are respectively journaled in a pair of the journal bearings 49 and 57. The said shaft 60 has tightly secured thereto the similar guide sleeves 63 with the enlarged portions 64. The latter tightly engage the ends of the roller 65. The roller 65 in this instance is made of wood. A pusher blade 66 with the enlarged ends 67 extends through suitable openings in the shaft 60 and the roller 65. Guide rollers 68 are journaled at the top and bottom portion of the enlarged ends 67. Sleeves 69 extend from the walls 44 and 45 and encircle the adjacent ends of the shaft 60. Packing 70 is located in each recess 50 and is held in place by the sleeves 69. A sprocket chain wheel 71 is fastened to the portion 62 of the shaft 60.

A second shaft 75 similar to 60 is indicated with the end portions 76 and 77, respectively, similar to the ends 61 and 62. The portions 76 and 77 are journaled in the second pair of journal bearings 49 and 57.

The shaft 75 has also fastened thereto sleeves 78 similar to 63, and the sleeves 78 engage a roller 79 similar to 65. A pusher plate 80 similar to 66 extends through openings in the shaft 75 and the roller 79. Guide rollers 81 similar to 68 are journaled to the top and bottom portions of the pusher plate 80. A sprocket chain wheel 82 is fastened to the portion 77 of the shaft 25.

Two pairs of guides 83, 83ª and 84, 84ª have extending therefrom lugs 85 by means of which they are fastened to the inner faces of the walls 44 and 45. Each of the guides has formed therewith arms 83ᵇ and 83ᶜ.

A charging hopper 88 is detachably secured to the upper end of the walls of the feeding chamber A.

The walls 22ª of the conveying and kneading chamber B at their junction from the longitudinal apex 23ª which joins with the apex 23. The apex 23ª does not extend the full length of the chamber B but vanishes at a point 23ᵇ somewhat to the rear of the front end of said chamber to form the pocket 23ᶜ. At the upper side ends of the walls 22ª are formed the grooves 93 for packing strips 94. Ribs 95 with lugs 96 extend from the outer faces of the walls 22ª, and ribs 97 with lugs 98 extend from said walls. Ribs 99 extend from the outer faces of the walls 22 and 22ª. At the outer ends of the walls 22ª is formed the flange 100.

A cover for chamber B is indicated with the pair of semicircular walls 105 which at their juncture form the longitudinal apex 106. The latter is directly above the apex 23ª and the space between said apexes constitutes a longitudinal port 107. At the sides of the walls 105 are formed flanges 108, which bear upon the packing strips 94. Ribs 110 and 111 are formed with the walls 105. A flange 114 is formed with the rear end of the wall 105 and a flange 115 is formed with the front end of the said walls 105. The apex 106 does not extend the full length of the chamber B. At the rear end of the chamber B is formed the pocket 116 and at the front end is formed the pocket 117 which latter connects with the pocket 23ᶜ.

The flange 114 abuts against the front face of the wall 44 of the chamber A. Lugs 120 extend from the sides of the walls 105 and are directly above the lugs 96. Blocks 121 are fastened to the upper faces of the lugs 96 and have pivoted thereto the U shaped straps 122. Screws 123 are in threaded engagement with the upper members of the straps 122 and normally bear upon the top faces of the lugs 120 to maintain the cover of the chamber B in operative position.

In the forward end of the chamber B are detachably secured a pair of journal bearings 126. Shafts 127 and 128 are journaled in the bearings 126 and in the journal bearings having the caps 37 and have respectively fastened thereto the sprocket chain wheels 129 and 130. A sprocket chain 131 connects the sprocket chain wheels 71 and 129 and a sprocket chain 132 connects the sprocket chain wheels 82 and 130. Spur gears 135 that mesh with each other are fastened to the shafts 127 and 128. On the shaft 127 is fastened a conveyer comprising section 140 with blades 140ª of a continuous right hand helix, which is located in the lower portion of the chamber A and extends into the chamber B. The remaining portion of the shaft 127 has fastened thereto a conveyer of the same pitch which comprises sections 141 of a right handed double threaded interrupted helix consisting of the blades 142. The blades 142 of one thread break joints with the blades of the other thread. The shaft 128 has fastened thereto a left hand conveyer with sections 145 having blades 145ª respectively similar to 140 and 140ª and left hand sections 146 with blades 148, respectively, similar to 141 and 142.

In place of the conveyers just described the shafts 127 and 128 may have secured thereto conveyers comprising sections 147 of double threaded helices one of which consists of a continuous worm 149 and the other comprises the blades 150. One of the latter conveyers would be right hand and the other left hand.

It is to be understood that various combinations may be made of the sections of the conveyers indicated in Fig. 2, that is to say the sections thereof may be fastened in various parts of the shafts 127 and 128.

A pair of legs 150 are connected at their upper ends by a cross wall 151 and have formed therewith the flanges 152. The table 35 is supported upon and fastened to the flanges 152. An open chamber with the walls 153, 154 and 155 extends from the legs 150. Journal bearings 157 and 158 extend from the wall 155. An elongated journal bearing 160 extends from the wall 154 and is also connected to the journal bearing 158 by a web 161. A driving shaft 162 is journaled in the journal bearing 160. A spur gear 163 is fastened to the shaft 162 and a spur gear 164 is fastened to the shaft 127 and meshes with the spur gear 163. Legs 165 have formed therewith flanges 166 that support the lugs 98 to which they are bolted. The legs 165 are longer than the legs 150.

A discharging chute D is fastened to the outer end of the chamber B, and comprises the plate 171 that has extending therethrough the tapered outlet openings 172 and a central discharge port 173 which latter is preferably threaded for a fluid discharge pipe 174. A bottom wall 176 and the side walls 177 extend from the plate 171.

In place of the discharging chute D an adjustable nozzle E may be fastened to the outer end of the chamber B. The nozzle E comprises the flange 180 from which extend the top wall 181, the bottom wall 182 and the side walls 183. A guide lug 184 with the guide opening 185 extends from the top wall 181. An adjusting wing 188 is pivoted to the top wall 181, by means of the hinge pin 189. A lug 190 extends from the wing 188 and has hinged thereto the arm 191 having openings 192 for a pin 193. The arm 191 extends through the opening 185.

Referring to Fig. 3 the chambers A and B are provided with means for sterilizing the inner surfaces thereof. The said means consist of the cover plate 198 which is detachably fastened to the top of the walls of the chamber A and the cover plate 199 which is detachably fastened to the front end of the chamber B. A pipe 200 for a cleansing fluid is in threaded engagement with an opening in the plate 199.

To use the machine the shaft 162 is turned by means not shown and the plastic substance, which in this instance is butter is introduced into the charging hopper 88. The pusher blades 66 and 80, respectively, rotate in the directions of the arrows 205 and 206 and draw the butter into the chamber A and force it to the oppositely rotating conveyers on the shafts 127 and 128. The pusher blade 66 is rotated by means of the shaft 127, the sprocket chain wheels 71, 129 and the sprocket chain 131. During the rotations of the blade 66 it is reciprocated by means of the guides 83 and 83ª, by reason of the contacting of the guide rollers 68 with said guides and the sleeves 63. The said guides 83 and 83ª do not fully extend around the shaft 127 and only contact with the guide rollers below a horizontal plane passing through the axis of the shaft 127. The said guide rollers 68 while contacting with lower portions of the guide 83 and the arm 83ᵇ also contact, as already stated, with the guide sleeves 63, by means of which the pusher blade 66 is prevented from becoming disengaged from the shaft 60 and the roller 65. Before the blade 66 reaches a horizontal position and before one pair of the guide rollers 68 disengage from the arm 83ᵇ the pair of guide rollers 68 at the other end of the pusher blade are below the end of the arm 83ᵇ, and in proper position to contact with the latter arm upon further rotation of the shaft 127. By means of this construction no guides are necessary to contact with the guide rollers 68 when they are in their upper position above the axis of the shaft 127. Guides for the upper portion of the rollers 68 would not be continuously in contact with the substance operated upon and would therefore be liable to become covered with deposits of said substance which becomes foul. The operations of the pusher blade 80 is similar to that described for the blade 66. While the substance is being forced downwardly by the pusher blades 66 and 80 it is also being kneaded and blended by said blades. When the substance reaches the blades 140ª and 145ª, it is moved forwardly into the chamber B and while moving toward the chamber B, some of the water in the substance is pressed therefrom which escapes by way of the piping 29. When the substance is moving in the chamber A, the upper portion thereof abuts against the front wall 44 and it practically moves through the opening formed by the semicircular openings 52 of the said wall 44 and the semicircular walls 22 of said chamber A. The port 55 which is not in line with the mass of substance moved by conveyers, permits another portion of the water pressed therefrom to enter the pocket 116 of the chamber B. In the chamber B the substance is kneaded and blended by the blades 142 and 148 of the conveyers therein and conveyed to the chute D. While the substance is being kneaded and blended in the chamber B, another portion of the water therein is pressed therefrom which with the water in the pocket 116 can escape by way of the piping 29. The substance is now forced through the tapered openings 172 of the plate 171 and while passing therethrough is again kneaded, blended and has a portion of the water thereof pressed therefrom and is deposited upon the bottom wall 176 of the chute D, after which it is taken away. When the openings 56 are made in the wall 44, they reduce the pressure somewhat on the substance. In case the adjustable nozzle E is fastened to the outer end of the chamber B in place of the chute D, the substance as it passes through the nozzle is ejected therefrom in various thicknesses, depending upon the position of the adjusting wing 188.

When the machine is not used for the kneading and blending operations it may be cleaned and sterilized as follows:

The charging hopper 88 is removed from the chamber A and the cover plate 198 is fastened to the top end of said chamber A. The cover plate 199 with the pipe 200 is fastened to the front end of the chamber B and a cleansing fluid, water or steam is forced through the machine which escapes through the piping 29.

Various modifications may be made in the construction of the invention and the present exemplification is to be taken as illustrative and not limitative thereof.

Having described our invention what we desire to secure by Letters Patent and claim is:—

1. In a machine of the character described the combination of a pair of chambers connected at their lower portions, side walls for the first chamber that connect with semi-circular bottom walls forming a longitudinal apex at their juncture, the said bottom walls with their apex extending to form the bottom and side walls of the second chamber, a rear wall for the first chamber, a front wall for the first chamber, said front wall having semi-circular openings at its bottom end, which at their juncture form an apex, the apex of said front wall over the other apex forming a port between them, a cover for the second chamber having semi-circular walls forming at their juncture a longitudinal apex, the latter apex vanishing in the vicinity of the ends of the cover forming pockets in said second chamber at the ends thereof and means to knead and blend a material in said chambers and to force the same therethrough.

2. In a machine of the character described the combination of a feeding chamber, a conveying chamber having an outlet and extending from the feeding chamber, a pair of oppositely rotating helical conveyors located in the conveying chamber and in the lower portion of the feeding chamber, to knead and convey a material operated upon, said conveying chamber having pockets formed at its ends to collect fluids pressed from the material operated upon and means to discharge said fluids.

3. In a machine of the character described the combination of a feeding chamber with an outlet, a conveying chamber extending from the feeding chamber, means to push down a material operated upon in the feeding chamber, helical conveyors in the feeding chamber below said means and extending into said conveying chamber to knead and convey the material operated upon and to discharge it from said conveying chamber, said conveying chamber having pockets formed at its ends to collect fluids pressed from the material operated upon and means to discharge said fluids.

4. In a machine of the character described the combination of a feeding chamber, a conveying chamber having an outlet and extending from the feeding chamber, a pair of oppositely rotating helical conveyors located in the conveying chamber and in the lower portion of the feeding chamber, to convey and knead a material operated upon, a portion of each conveyor comprising a continuous helix and another portion of each conveyor comprising an interrupted helix to form blades that break joints with each other, said conveying chamber having pockets formed at its ends to collect fluids pressed from the material.

5. In a machine of the character described the combination of a feeding chamber having a rear wall and a front wall, a conveying chamber extending from said front wall and having an outlet, continuous semi-circular bottom walls for both chambers forming a longitudinal apex at their junction, a cover for the feeding chamber having semi-circular walls forming at their junction a longitudinal apex, the latter apex vanishing in the vicinity of the ends of the cover forming pockets in the conveying chamber at its ends and means to convey, knead and blend a material in said chambers.

Signed at Bayonne, in the county of Hudson and State of New Jersey, this 22d day of Sept., A. D. 1921.

ALBERT SHARP.
GEORGE SHARP.